Oct. 7, 1924.  
J. F. WEEKS  
PULVERIZER  
Filed May 24, 1922
1,510,638
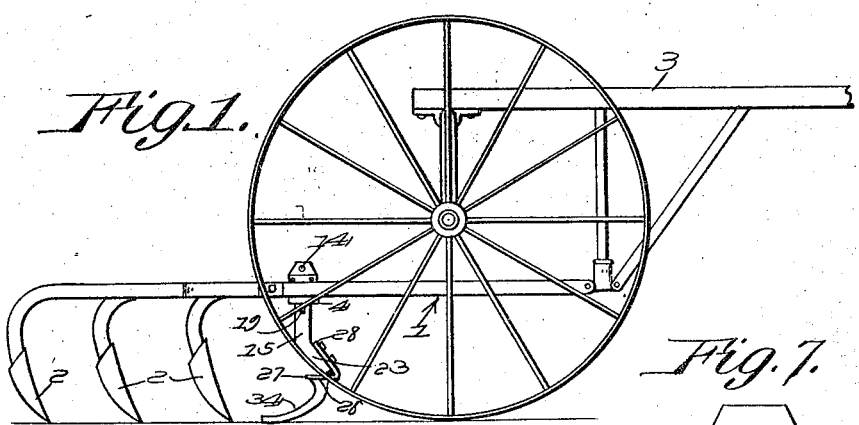
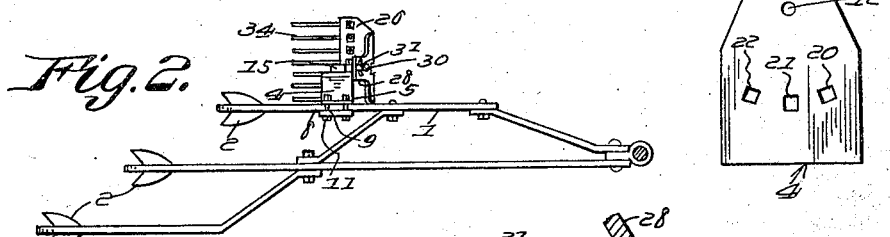
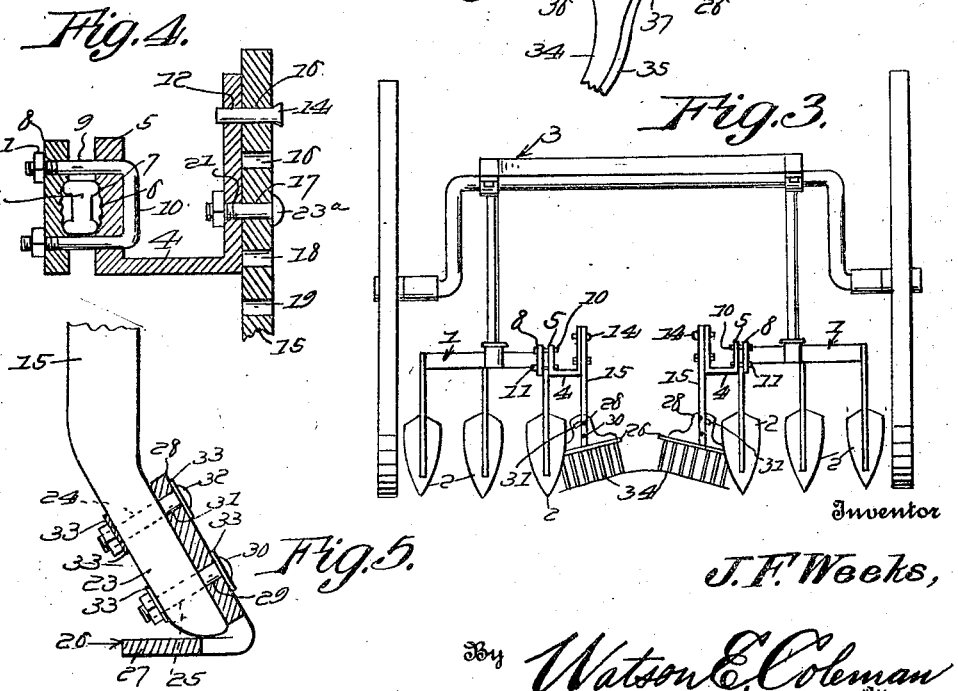

Patented Oct. 7, 1924.

1,510,638

UNITED STATES PATENT OFFICE.

JESSE F. WEEKS, OF ST. HELENA, CALIFORNIA.

PULVERIZER.

Application filed May 24, 1922. Serial No. 563,272.

*To all whom it may concern:*

Be it known that I, JESSE F. WEEKS, a citizen of the United States, residing at St. Helena, in the county of Napa and State of California, have invented certain new and useful Improvements in Pulverizers, of which the following is a specification, reference being had to the accompanying drawings.

It is the purpose of the present invention to provide a device of this kind particularly adapted for use in connection with cultivators, for the purpose of pulverizing the ground in advance of the plows, thereby obviating the necessity of harrowing.

After rain or irrigating the ground, the ground is in such condition as to necessitate using the plow too far from the plants. In case it rains after the plants have been put in the ground and before the plants are up or have come through, the present pulverizer can be used to a great advantage in loosening the ground so that the plants may break through. It is, therefore, the purpose of the present invention to provide a pulverizer for the soil adapted to be used in connection with the cultivator so that at the same time the ground is cultivated the soil may be pulverized closer to the plants in advance of the plows of the cultivator.

Furthermore by using the present form of pulverizer, the soil may be thoroughly broken up and pulverized very close to the young plants without covering them up, thereby preventing the growth of undesirable vegetation, such as weeds and the like around and very close to the plants, which heretofore have to be removed or taken out by means of a hoe, which requires considerable labor and expense.

Still another purpose is to provide a pulverizer which can be attached to any conventional form of cultivator by means of conventional forms of foot pieces, which are similar to those which fasten shovels or sweeps to a cultivator.

A further purpose is to provide an improved pulverizer including means for attaching the same to the cultivator, in such wise as to permit the pulverizer to be adjusted at any desired angle in order to accommodate the pulverizing members to the irregularities of the ground.

It is obvious that the pulverizer may be detached from in front of and bolted to the rear foot pieces, and thereby pulverize the soil in the rear of the plows.

A still further purpose is the provision of a pulverizer including improved means for fastening the pulverizer detachably to the drag bars, there being means to prevent accidental rotary movement of the attachment.

Still further, the invention aims to provide means adapted to break and permit the pulverizer to automatically become inoperative, in case the pulverizing members or teeth strike or come in contact with an obstruction in their path.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in side elevation showing the application of the improved pulverizer to a conventional form of cultivator;

Figure 2 is a plan view showing part of the cultivator, with the pulverizer attached to one of the drag bars of the same;

Figure 3 is a rear view of a cultivator, showing pulverizers attached to the inside adjacent drag bars which support plows:

Figure 4 is an enlarged detail sectional view through one of the supports for the standard 15;

Figure 5 is a detail sectional view through the foot, which is attached to the foot piece of the standard;

Figure 6 is a sectional view showing the manner of fastening one of the fingers or teeth to the plate 26 of the foot;

Figure 7 is a detail view in elevation of one side of the support 4, showing the openings 20, 21 and 22.

Referring to the drawings, 1 designates conventional drag bars of a cultivator 3 which carry plows 2 at their rear lower end portions. Carried by each inner drag bar is a support and holder for the pulverizer, whereby the pulverizer may be held in a position to one side and in advance of the inner plow of the beam. This support 4 is preferably U-shaped, and one arm 5 thereof is provided with a longitudinal cavity 6, which is of arcuate shape in cross section. The cavity is provided with a plurality of longitudinal corrugations 7, which grip the drag bar and prevent the holder or support from turning or rotating, due to lateral pressure upon the pulverizer. The clamping plate engages the opposite side of the drag bar, and passing through the clamping plate 8 are the arms 9 of the U-bolts 10, which have their arms or shanks passing through one side of the holder or support, and straddle upon opposite sides of the drag bar, there being nuts 11 or other suitable means applied upon the arms of the bolts, so as to secure the holder or support to the drag bar. The clamping plates also have corrugations, acting to prevent the holder or support from turning relatively to the drag bar.

The other arm of the holder or support is provided with a break pin receiving opening or aperture 12, which receives a break pin 14, for connecting the shank or standard 15 to the holder or support. Obviously should the pulverizer come in contact with an obstruction in its path, the pin 14 would break and permit the pulverizer to swing to the rear, under the pressure of the obstruction upon the pulverizing members or teeth. The break pin 14 passes through either one of the openings 16 of the standard 15. The standard is provided with a plurality of spaced openings 17, 18 and 19, which are rectangular in shape, and any one of them is designed to register with either one of the apertures or openings 20, 21 and 22. In fact a suitable bolt 23ª also passes through any one of the apertures 17, 18 and 19, and through either one of the apertures 20, 21 and 22, for holding the standard 15 in different vertically adjusted positions, and either substantially perpendicularly, or inclined forwardly or rearwardly.

The lower end of the standard terminates in a foot piece 23, which is provided with a pair of openings or apertures 24 and 25.

In order to support and carry the pulverizing teeth on the foot piece 23, an angular holder or foot 26 is provided. This foot 26 comprises a plate 27 and an angular extension 28, which is restricted at its upper end portion. The extension 28 extends at an acute angle to the plate 27. Passing through an opening or aperture 29 of the extension 28 is a suitable bolt 30, which also passes through the opening or aperture 25, thereby connecting the extension of the foot to the foot piece 23. Adjacent the extremity of the extension 28 is an arcuate slot 31, whose radius extends from the center of the opening or aperture 29, and engaging through the slot 31 is a suitable bolt 32, there being suitable washers 33 adjacent the forward face of the extension and the rear face of the foot piece 23. This bolt which passes through the arcuate slot carries a suitable nut, whereby upon loosening the same, the foot can be adjusted to any angle, suitable to accommodate the same to the slope of the ground as shown in Figure 3.

Connected to the plate 27 and extending downwardly and rearwardly are pulverizing teeth 34, the lower edges of which are sharpened, as shown at 35, for the purpose of cutting up and pulverizing the soil. These pulverizing fingers or teeth where they are connected to the plate 27 of the foot, have rectangular extensions 36 passing through similar shaped openings 37, in order to hold the pulverizing teeth or fingers rigidly connected to the foot. Similar nuts are threaded upon the cylindrical reduced members of the rectangular extensions of the teeth or fingers for holding them rigidly to the plate of the foot.

It will be noted that due to the holder or support 4, each pulverizer element is supported by a drag bar of the cultivator to one side of a plow and in advance thereof, thereby enabling the pulverizer to operate very close to the young plants, and thereby effectively chop up the hard surface soil or ground.

The invention having been set forth, what is claimed is:—

1. A soil pulverizer attachment for the drag bar of a cultivator comprising a U-shaped bracket provided with clamping means on one arm for engagement upon the drag bar, a vertical standard pivoted on the other arm and swingable forwardly or rearwardly in a vertical plane, means for holding said standard in an adjusted position, an angular element carried by the lower end of the standard and including a rearwardly extending horizontal flange, and a plurality of downwardly and rearwardly curved teeth detachably secured to said flange.

2. A soil pulverizing attachment for the drag bar of a cultivator, comprising an upstanding U-shaped bracket provided at one arm with clamping means for engagement upon the drag bar and having its opposite arm formed with a hole and a plurality of openings arranged in concentric series with respect thereto, a standard pivoted to said second named arm at said hole and carrying a securing element passing through the standard and through a selected one of said series of openings for holding the standard in angularly adjusted position, an acute angular plate carried by the lower end of the standard and having a rearwardly extending flange, and a plurality of teeth detachably connected with said flange.

3. A soil pulverizer attachment for the drag bar of a cultivator, comprising an angular bracket provided on one arm with clamping means for engagement upon the draft bar, a vertical standard pivoted on the other arm and swingable in a vertical plane, means for holding said standard in an adjusted position, an angular element carried by the lower end of the standard and including a rearwardly extending portion, and a plurality of depending teeth secured to said depending portion.

4. The combination with the rearwardly extending drag bars of a cultivator, and plows carried by said bars arranged to operate between them on each side of a row of plants, the inner plows on opposite sides being spaced apart to straddle a row of plants, of a pair of spaced pulverizing devices, each having rigid attachement to one of said inner drag bars and arranged forwardly and inwardly of the latter, each pulverizing device embodying a tooth carrying plate and a supporting standard having pivotal connection with each other, whereby the tooth carrying plates are mounted for lateral tilting movement, said means for rigidly attaching the pulverizing elements to the drag bars each embodying a clamp engaging the adjacent drag bar and having a lateral and inwardly extending member to which the upper end of an adjacent standard is pivoted for vertical swinging movement in a direction longitudinally of the drag bars.

5. A soil pulverizing attachment for the drag bar of a cultivator, comprising an upstanding U-shaped bracket provided on one arm with means for engagement upon the drag bar and having its other arm formed with a hole, and a plurality of openings arranged in concentric series with respect to the hole, a standard formed with a plurality of holes, a pivot bolt passing through a selected one of the holes in the standard and through the hole in the arm, a securing element adapted to be passed through a selected one of the openings in the standard registering therewith for maintaining the standard in an adjusted position, and a plurality of depending teeth carried by the standard.

6. A soil pulverizing attachment for the drag bar of a cultivator comprising a clamp having a laterally extending portion, a vertical standard having its upper end portion pivoted to the laterally extending portion of the clamp for vertical swinging movement longitudinally of the drag bar, and a tooth carrying plate pivotally attached to the lower end of the standard for lateral tilting movement, said standard including a forwardly inclined foot portion, said plate having a forwardly inclined upper portion attached to the foot portion of the standard, and a horizontally rearwardly projecting lower portion carrying the teeth.

In testimony whereof I hereunto affix my signature.

JESSE F. WEEKS.